(12) United States Patent
Hasegawa et al.

(10) Patent No.: US 8,084,529 B2
(45) Date of Patent: Dec. 27, 2011

(54) THERMOSETTING SILICONE RUBBER COMPOSITION

(75) Inventors: Chiichiro Hasegawa, Awara (JP); Yoshiaki Miyazaki, Sakai (JP)

(73) Assignee: Dow Corning Toray Co., Ltd., Tokyo (JP)

( * ) Notice: Subject to any disclaimer, the term of this patent is extended or adjusted under 35 U.S.C. 154(b) by 56 days.

(21) Appl. No.: 12/521,389

(22) PCT Filed: Dec. 27, 2007

(86) PCT No.: PCT/JP2007/075418
§ 371 (c)(1), (2), (4) Date: Jun. 16, 2010

(87) PCT Pub. No.: WO2008/082001
PCT Pub. Date: Jul. 10, 2008

(65) Prior Publication Data
US 2010/0280163 A1    Nov. 4, 2010

(30) Foreign Application Priority Data

Dec. 28, 2006 (JP) ................................. 2006-356606

(51) Int. Cl.
*C08K 3/22* (2006.01)
*C08G 77/04* (2006.01)
(52) U.S. Cl. ......................................... 524/430; 528/24
(58) Field of Classification Search .................. 524/430
See application file for complete search history.

(56) References Cited

U.S. PATENT DOCUMENTS

| | | | |
|---|---|---|---|
| 3,821,140 A * | 6/1974 | Milbert | 523/213 |
| 4,025,485 A | 5/1977 | Kodama et al. | |
| 4,360,388 A | 11/1982 | Nauroth et al. | |
| 4,366,278 A * | 12/1982 | Hamada et al. | 524/210 |
| 5,104,919 A * | 4/1992 | Okami et al. | 524/94 |
| 5,312,855 A * | 5/1994 | Okami | 524/290 |
| 5,376,304 A | 12/1994 | Yamamoto et al. | |
| 5,384,075 A * | 1/1995 | Okami | 252/511 |
| 5,543,126 A * | 8/1996 | Ota et al. | 423/263 |
| 5,962,343 A * | 10/1999 | Kasai et al. | 438/693 |
| 6,221,118 B1 * | 4/2001 | Yoshida et al. | 51/309 |
| 6,239,205 B1 * | 5/2001 | Hasegawa et al. | 524/403 |
| 6,284,829 B1 * | 9/2001 | Dalbe et al. | 524/430 |
| 6,379,806 B1 * | 4/2002 | Takamura et al. | 428/447 |
| 6,706,082 B2 * | 3/2004 | Ota et al. | 51/307 |
| 7,547,743 B2 * | 6/2009 | Goto et al. | 524/588 |
| 2004/0106706 A1 * | 6/2004 | Tanaka et al. | 524/104 |
| 2004/0176517 A1 * | 9/2004 | Hatanaka et al. | 524/440 |
| 2005/0036928 A1 * | 2/2005 | Katusic et al. | 423/263 |
| 2005/0252092 A1 * | 11/2005 | Kim et al. | 51/307 |

FOREIGN PATENT DOCUMENTS

| | | |
|---|---|---|
| JP | 52014654 A | 2/1977 |
| JP | 60173050 A | 9/1985 |
| JP | 1306435 A | 12/1989 |
| JP | 4300644 A | 10/1992 |
| JP | 09142840 A | 6/1997 |
| JP | 2000-212444 A | 8/2000 |
| JP | 2002-179917 A | 6/2002 |
| JP | 2005-247904 A | 9/2005 |
| JP | 2006-299126 A | 11/2006 |
| JP | 2007-063388 A | 3/2007 |
| JP | 2007-179047 A | 7/2007 |

OTHER PUBLICATIONS

English language abstract for JP 52014654 extracted from espacenet.com database, dated Nov. 16, 2009, 8 pages.
English language abstract for JP 60173050 extracted from espacenet.com database, dated Nov. 16, 2009, 9 pages.
English language abstract for JP 1306435 extracted from espacenet.com database, dated Nov. 16, 2009, 8 pages.
English language abstract for JP 4300644 extracted from espacenet.com database, dated Nov. 16, 2009, 7 pages.
English language translation and abstract for JP 09-142840 extracted from PAJ database, dated Nov. 17, 2009, 31 pages.
English language translation and abstract for JP 2000-212444 extracted from PAJ database, dated Nov. 17, 2009, 27 pages.
English language translation and abstract for JP 2002-179917 extracted from PAJ database, dated Nov. 17, 2009, 36 pages.
English language translation and abstract for JP 2005-247904 extracted from PAJ database, dated Nov. 17, 2009, 33 pages.
English language translation and abstract for JP 2006-299126 extracted from PAJ database, dated Nov. 17, 2009, 63 pages.
English language translation and abstract for JP 2007-063388 extracted from PAJ database, dated Nov. 17, 2009, 49 pages.
English language translation and abstract for JP2007-179047 extracted from PAJ database, dated Nov. 17, 2009, 50 pages.
PCT International Search Report for PCT/JP2007/075418, dated Apr. 15, 2008, 4 pages.

* cited by examiner

*Primary Examiner* — Robert Loewe
(74) *Attorney, Agent, or Firm* — Howard & Howard Attorneys PLLC

(57) ABSTRACT

A thermosetting silicone rubber composition that contains a cerium oxide powder in an amount of 0.001 to 10 mass % and that is characterized by total transmittance of light equal to or greater than 90% according to JIS K7105 when the light is passed through a 1 mm-thick layer of an alkenyl-containing dimethylpolysiloxane gum with 0.1 mass % of said cerium oxide powder dispersed in the gum.

11 Claims, No Drawings

THERMOSETTING SILICONE RUBBER COMPOSITION

RELATED APPLICATIONS

This application claims priority to and all the advantages of International Patent Application No. PCT/JP2007/075418, filed on Dec. 27, 2007, which claims priority to Japanese Patent Application No. JP2006-356606, filed on Dec. 28, 2006.

FIELD OF THE INVENTION

The present invention relates to a thermosetting silicone rubber composition compounded with a specific cerium oxide powder.

BACKGROUND OF THE INVENTION

It is known to add a cerium oxide powder as a compression-set improver and a heat-resistant agent to a silicone rubber composition (see, e.g., Japanese Unexamined Patent Application Publication (hereinafter referred to as "Kokai") S52-14654 and Kokai S60-173050). However, when an uncured silicone rubber composition that incorporates a cerium oxide powder is exposed to a temperature that exceeds 70° C., then, due to the high reactivity of the cerium oxide powder, the uncured silicone rubber composition either acquires high viscosity, or becomes partially cross-linked. In order to obviate the above problems in the production of the silicone rubber composition, that has to be combined with a cerium oxide powder, the mixture of the composition with the cerium oxide powder is either cooled to a sufficient degree directly in a kneader mixer, or cooled in the outflow from the kneader mixer. Such a solution requires the use of specific mixing equipment and does not allow shortening of the production process. Furthermore, cured products obtained from a conventional silicone rubber composition combined with a cerium oxide powder are not transparent, and therefore have a limited scope of practical application.

Kokai 2000-212444 discloses a silicone rubber composition that incorporates a cerium oxide powder in an aqueous dispersion with pH in a predetermined range. However, in an uncured state, this silicone rubber composition has insufficient thermal stability, and in order to obtain a cured body of the composition with improved compression set and resistance to heat at temperatures that exceed 200° C., the cerium oxide must be added in large quantities.

DISCLOSURE OF THE INVENTION

It is an object of the invention to provide a thermosetting silicone rubber composition that, during preparation and prior to curing, possesses excellent thermal stability and that, after curing, forms silicone rubber characterized by high resistance to heat.

The above object is achieved by providing a thermosetting silicone rubber composition that contains a cerium oxide powder in an amount of 0.001 to 10 mass % and that is characterized by total transmittance of light equal to or greater than 90% according to JIS K7105 when the light is passed through a 1 mm-thick [layer] of an alkenyl-containing dimethylpolysiloxane gum with 0.1 mass % of said cerium oxide powder dispersed in the gum.

It is recommended that the aforementioned thermosetting silicone rubber composition comprise: 100 parts by mass of an alkenyl-containing diorganopolysiloxane (A); 5 to 150 parts by mass of a reinforcement filler (B); a curing agent (C) (in an amount sufficient for curing the aforementioned thermosetting silicone rubber composition); and a cerium oxide powder (D), which, when dispersed in an alkenyl-containing dimethylpolysiloxane gum in an amount of 0.1 mass %, provides total transmittance of light equal to or greater than 90% according to JIS K7105 when the light is passed through a 1 mm-thick layer of said dimethylpolysiloxane gum (the content of component (D) in the composition ranges from 0.001 to 10 mass %). It is also recommended that the curing agent comprise an organic peroxide.

It is recommended that the aforementioned cerium oxide powder comprise a surface-treated cerium oxide powder produced by a sol-gel method.

Since during preparation of the composition the cerium oxide powder can be compounded with the thermosetting silicone rubber composition of the invention at a relatively high temperature, this makes it possible to shorten the production time and improve thermal stability of the composition during manufacturing and at uncured state. The thermosetting composition of the invention makes it possible to form molded silicone-rubber products that demonstrate excellent resistance to heat, a reduced compression-set, and a reduced impairment of physical properties, e.g., a tensile strength, after exposure to temperatures exceeding 200° C. Furthermore, the thermosetting silicone rubber composition of the invention is characterized in that the composition make it possible to form molded silicone-rubber products that demonstrate a reduced compression set, a reduced impairment of physical properties, such as tensile strength, after exposure to a temperature exceeding 200° C., and a heat-resistant body which is transparent or semi-transparent. The cerium oxide powder which is characterized by total transmittance of light equal to or greater than 90% according to JIS K7105 when the light is passed through a 1 mm-thick layer of an alkenyl-containing dimethylpolysiloxane gum with 0.1 mass % of said cerium oxide powder dispersed in the gum can reduce the compression set of the cured product of the thermosetting silicone rubber composition with lower amount of addition of the cerium oxide and allow obtaining of the product in a transparent or semitransparent form.

PREFERRED EMBODIMENTS OF THE INVENTION

The cerium oxide powder used in the present invention is characterized by providing a total light transmittance according to JIS K7105 equal to or greater than 90% when light is passed through a 1 mm-thick layer of an alkenyl-containing dimethylpolysiloxane gum having 0.1 wt. % of the cerium oxide dispersed in this gum. The cerium oxide powder is a powdered compound of the following formula: $CeO_a$ (where "a" is a number from 0.2 to 2.1). The above powder may also comprise a hydrate which is the aforementioned compound bonded to a small amount of crystallization water.

In order to provide improved handleability, the alkenyl-containing dimethylpolysiloxane gum that contains the dispersed cerium oxide powder may preferably have a polystyrene referenced number-average molecular weight measured by gel-permeation chromatography (GPC) in the range of 200,000 to 1,000,000, and more preferably in the range of 300,000 to 700,000. Dimethylpolysiloxane units constitute main components of the alkenyl-containing dimethylpolysiloxane gum, and the alkenyl groups function as cross-linking groups. The alkenyl groups can be represented by vinyl, allyl, or hexenyl groups. The vinyl groups are preferable. In order to improve handleability after curing the composition with dispersed cerium oxide, it is recommended that the content of alkenyl groups range from 0.03 to 0.10 mass %.

There are no special limitations with regard to the method that can be used for dispersing the cerium oxide powder in the alkenyl-containing dimethylpolysiloxane gum. For example, this can be done with the use of a two-roll or a three-roll mill. In order to provide a constant thickness in measuring the complete light transmittance, it is recommended to cure a mixture of the alkenyl-containing dimethylpolysiloxane gum and the cerium oxide powder with the use of organic peroxide. For this purpose, a conventional organic peroxide of the type normally used as a curing agent for thermosetting silicone rubber composition can be employed. Specific examples are the following: benzoyl peroxide, tertiary-butyl perbenzoate, orthomethylbenzoyl peroxide, paramethyl benzoyl peroxide, ditertiarybutyl peroxide, dicumyl peroxide, 1,1-bis (tertiarybutyl-peroxy) 3,3,5-trimethylcyclohexane, 2,5-dimethyl-2,5-di(tertiarybutyl-peroxy) hexane, and 2,5-dimethyl-2,5-di(tertiary-butyl peroxy) hexyne. These compounds can be used individually or in combinations of two or more. Normally, the organic peroxide may be added in an amount of 0.1 to 2 parts by mass per 100 parts by mass of the alkenyl-containing dimethylpolysiloxane gum.

The cerium oxide powder used in the present invention can be obtained by any of the following conventional methods: the cerium oxide powder is produced by mechanically crushing a product obtained by baking cerium carbonate or a similar cerium oxide precursor, at a temperature equal to or greater than 500° C.; the cerium oxide powder is produced by mechanically crushing or deflocculating with an acid a product of a reaction between a cerium oxide precursor, such as a cerium carbonate, and an oxidizer; the cerium oxide powder is produced by causing a reaction between an aqueous solution of cerium nitrate, cerium ammonium nitrate, or a similar cerium salt, and an alkali metal salt such as a sodium salt, ammonia, or the like, whereby a cerium oxide colloidal gel is obtained by a sol-gel method; or the cerium oxide powder is produced by spraying a solution of a cerium precursor obtained from an aqueous solution of cerium acetate, cerium chloride, or the like, into a flame, thus conducting thermal decomposition from a gaseous phase. Most preferable from the viewpoint of maintaining low crystallinity and preventing reaggregation of particles is the method of baking of the cerium oxide precursor, the method of reacting a cerium oxide precursor with an oxidizer, and the sol-gel method, in particular, when the cerium oxide is obtained by a sol-gel method (see Kokai H01 306435, Kokai H04-300644, and Kokai H09-142840) that makes it possible to reduce the compression set of the cured product of thermosetting silicone rubber composition with less amounts of addition of cerium oxide. Mechanical crushing can be carried out by dry crushing in a hammer mill, jet mill, etc., or by wet crushing in a wet bead mill. The wet-crushing method is preferable since it facilitates removing of coarse particles and obtaining products in the form of fine powders.

The cerium oxide powder used in the invention may be surface treated with surfactants. The surface treatment operation can be carried out simultaneously with wet crushing of the cerium oxide powder or during solation. It is expected that surface treatment of the cerium oxide powder has the effect of preventing reaggregation of cerium oxide particles and improving dispersion of the powder in the organopolysiloxane. There are no special restrictions with regard to the surfactants suitable for the aforementioned treatment, and this may be conventional surfactants, such as cationic surfactants, anionic surfactants, nonionic surfactants, fluorine-type surfactants, etc. Orthophosphoric acid, condensed phosphoric acid, and/or alkali metal salts or ammonia salts of these acids may also be used for treating the cerium oxide powder.

It is recommended that the diameter of primary particles of the cerium oxide powder used in the invention range from 1 to 100 nm, preferable from 1 to 30 nm, and the average diameter of such particles range from 10 to 1000 nm, preferably from 10 to 200 nm. Furthermore, in order to improve resistance to heat of the silicone rubber obtained by curing the thermally curable silicone rubber composition of the invention and intended for work at high temperatures, it is recommended that the degree of crystallization of the cerium oxide powder be in the range of 10 to 75%, and preferably in the range of 10 to 50%. In order to improve resistance to heat of the silicone rubber obtained by curing the thermally curable silicone rubber composition of the invention and intended for work at high temperatures, it is recommended that the BET specific surface area of the cerium oxide powder be in the range of 30 $m^2/g$ to 300 $m^2/g$, preferably in the range of 50 $m^2/g$ to 300 $m^2/g$, and most preferably in the range of 100 $m^2/g$ to 250 $m^2/g$.

It is recommended that the content of the aforementioned specific cerium oxide composition in the thermosetting silicone rubber composition be in the range of 0.001 to 10 mass %, preferably 0.001 to 2 mass %, and most preferably 0.005 to 1 mass %. There are no special restrictions with regard to the mechanism of curing, and the composition may comprise a conventional organic-peroxide curable or a hydrosilylation-reaction curable thermosetting silicone rubber composition. Typically, such a composition may comprise: 100 parts by mass of alkenyl-containing diorganopolysiloxane (A); 5 to 150 parts by mass of a reinforcement filler (B); a curing agent (C) (in an amount sufficient for curing the aforementioned thermosetting silicone rubber composition); and a cerium oxide powder (D), which, when dispersed in an alkenyl-containing dimethylpolysiloxane gum in an amount of 0.1 mass %, provides total transmittance of light equal to or greater than 90% according to JIS K7105 when the light is passed through a 1 mm-thick layer of said dimethylpolysiloxane gum (the content of component (D) in the composition ranges from 0.001 to 10 mass %).

Diorganopolysiloxane (A) is the main component of the thermosetting silicone rubber composition. Preferably, this component may contain in one molecule at least two silicon-bonded alkenyl groups. Such alkenyl groups may be represented by vinyl, allyl, propenyl, or similar groups. Organic groups other than the alkenyl groups may be exemplified by methyl, ethyl, propyl, butyl, pentyl, hexyl, octyl, decyl, dodecyl, or similar alkyl groups; phenyl, tolyl, or similar aryl groups; β-phenylethyl, or similar aralkyl groups; 3,3,3-trifluoropropyl, 3-chloropropyl, or similar halogen-substituted alkyl groups. Small amounts of hydroxyl groups can be bonded to molecular terminals. Component (A) may have a linear, partially branched linear, cyclic, or a net-like molecular structure, or the diorganopolysiloxane may have the aforementioned molecular structures in combination of two or more. The diorganopolysiloxane (A) may have viscosities varying from those of low-viscous liquids to highly viscous gums, but for obtaining cured products in the form of rubber-like resilient bodies, it is recommended that the viscosity of component (A) at 25° C. exceeds 100 mPa·s and, more preferably, component (A) be in the form of an gum with an average polystyrene-referenced molecular weight determined by gel permeation chromatography (GPC) in the range of 200,000 to 700,000.

Reinforcement filler (B) is a component used for imparting excellent mechanical strength to the silicone rubber, obtained by cross-linking and curing the thermosetting silicone rubber composition of the invention. This reinforcement filler may be exemplified by fumed silica, or similar dry-process silica, precipitated silica, or similar wet process silica. The silica may be in the form of a fine powder hydrophobically surface treated with an organosilane, a hexaorganodisilazane, a diorganopolysiloxane, a diorganocyclopolysiloxane, or a similar organic silicon compound. Preferably, this component may have particles with diameter not exceeding 50 μm and with a specific surface area of 50 to 400 m$^2$/g, and preferably 100 to 400 m$^2$/g. This component may be added in an amount of 5 to 150 parts by mass per 100 parts by mass of component (A). If the content is below the recommended lower limit, a cured body obtained by curing the thermosetting silicone rubber composition of the invention will have insufficient mechanical strength. If, on the other hand, the content exceeds the recommended upper limit of the range, it will be difficult to mix this component with component (A).

Curing agent (C) is a component that is used for cross-linking and curing the thermosetting silicone rubber composition of the invention when the latter is heated. This component may comprise an organic peroxide or a hydrosilylation catalyst in combination with an organohydrogenpolysiloxane used as a crosslinking agent.

The organic peroxide may comprise a conventional compound of this class. Preferable organic peroxide may be exemplified by the following compounds: 1,1-bis(tertiary-butylperoxy) 3,3,5-trimethylcyclohexane, 2,5-dimethyl-2,5-di(tertiary-butyl peroxy) hexane, or 2,5-dimethyl-2,5-di(tertiary-butyl peroxy)hexyne. Normally, the organic peroxide can be added in an amount of 0.1 to 5 parts by mass per 100 parts by mass of component (A).

When component (A) is a diorganopolysiloxane that has in one molecule two or more alkenyl groups, component (C) may comprise a hydrosilylation catalyst and an organohydrogenpolysiloxane as a cross-linking agent used together. The hydrosilylation catalyst may comprise a conventional one, such as chloroplatinic acid, an alcohol solution of chloroplatinic acid, or a complex of chloroplatinic acid with olefins, vinylsiloxanes or acetylene compounds, platinum black, platinum on the surface of a solid carrier, or a similar platinum-based catalyst; tetrakis (triphenylphosphine) palladium, or a similar palladium-based catalyst; or chloro-tris (triphenylphosphine) rhodium or a similar rhodium-based catalyst. Platinum-based catalysts are preferable. In terms of catalytic metal elements, the hydrosilylation catalysts may be used in an amount of 0.1 to 500 parts by mass, preferably 1 to 50 parts by mass per $10^6$ part by mass of the sum of components (A) and (B). If the hydrosilylation catalyst is used in an amount less than 0.1 part by weight, the curing will not sufficiently progress, and if it is added in an amount exceeding 500 parts by mass, this will be economically unjustifiable.

The organohydrogenpolysiloxane is a component that in the presence of the aforementioned hydrosilylation catalyst causes an addition reaction between the silicon-bonded hydrogen atoms of the organohydrogenpolysiloxane and silicon-bonded alkenyl groups of component (A). The organohydrogenpolysiloxane may contain in one molecule at least two silicon-bonded hydrogen atoms. Organic groups other than silicon-bonded hydrogen atoms, may be exemplified by methyl, ethyl, propyl, or similar alkyl groups; phenyl, tolyl, or similar aryl groups; 3,3,3-trifluoropropyl groups, 3-chloropropyl groups, or similar substituted alkyl groups, etc. Component (C) may have a linear, partially-branched, cyclic, or net-like molecular structure. Two or more molecular structures may be combined.

There are no special restrictions with regard to viscosity of the organohydrogen-polysiloxane. Preferably, the viscosity at 25° C. is in the range of 3 to 10,000 centipoises. It is recommended to add the organohydrogenpolysiloxane to the composition in such an amount that the ratio of the mole number of the silicon-bonded hydrogen atoms to the mole number of silicon-bonded alkenyl groups contained in the thermosetting silicone rubber composition of the invention range from (0.5:1) to (20:1), preferably from (1:1) to (3:1). If the ratio of the mole number of the silicon-bonded hydrogen atoms to the mole number of silicon-bonded alkenyl groups contained in the composition is below 0.5, it is be difficult to cure the composition to a sufficient degree. If, on the other hand, the aforementioned ratio exceeds 20, this will form blisters in the cured product.

Within the limits not contradictory to the objects of the invention, the thermosetting silicone rubber composition may be combined with various substances that are normally added to conventional silicone rubbers, such as diatomaceous earth, quartz powder, calcium carbonate, or a similar extender filler; titanium oxide, carbon black, red iron oxide, or a similar pigment; stearic acid, zinc stearate, calcium stearate, or a similar fatty acid salt, metal salts of the above compounds, or similar mold-release agents; and hydrosilylation reaction retarders.

The thermosetting silicone rubber composition of the invention is prepared by uniformly mixing aforementioned components (A) through (D). According to a preferable method, first, a silicon-rubber base composition is prepared by uniformly mixing component (B) in component (A) under heating conditions at a temperature of 80 to 250° C., and then, after cooling, the base composition is compounded with components (C) and (D). The surface of component (B) can be treated with hexamethyldisilazane or a low-molecular-weight diorganopolysiloxane having both molecular terminals capped with hydroxyl groups. The surface-treating component can be used in an amount of 1 to 30 mass % relative to the mass of component (B) and the treatment can be carried out prior to or when mixing component (B) with component (A).

The use of component (D) hinders partially curing of the silicon-rubber base composition, even when compounding is carried out at relatively high temperatures. Therefore compounding of the component (D) can be carried out when the silicone-rubber-base composition is cooling down at a temperature of 120 to 160° C. and the composition can be removed from the mixer at the same range of the temperature. In consequence, it becomes possible to reduce processing time of the composition with the use of component (D).

EXAMPLES

The invention will be further described in more details with reference to practical examples, which, however, should not be construed as limiting the scope of the invention application. In these examples, all parts are given in terms of parts by mass, the viscosities are measured at 25° C., and the values of number-average molecular weight are measured by gel permeation chromatography (GPC) and recalculated with reference to polystyrene.

Reference Example 1

Preparation of Silicone Rubber Base Composition No. 1

Silicone base composition No. 1 was prepared by loading the following components into a kneader mixer where the components were uniformly mixed and then kneaded for 60 min. at 175° C.: 100 parts of a gum copolymer of a methylvinylsiloxane and dimethylsiloxane which was capped at both molecular terminals with dimethylvinylsilyl groups and consisted of 99.8 mole % dimethylsiloxane units and 0.13 mole % methylvinylsiloxane units (the number average molecular weight was about 350,000); 40 parts of a dry-process fine silica powder having BET specific surface area of 300 mm$^2$/g; and 10 parts of a plasticizers in the form of a dimethylsiloxane oligomer that was capped at both molecular terminals with silanol groups and had a viscosity of 30 mPa·s.

Reference Example 2

Preparation of Silicone Rubber Base Composition No. 2

Silicone base composition No. 2 was prepared by uniformly mixing the following components in a kneader mixer: 100 parts of a gum copolymer of a methylvinylsiloxane and dimethylsiloxane which was capped at both molecular terminals with dimethylvinylsilyl groups and consisted of 99.8 mole % dimethylsiloxane units and 0.13 mole % methylvinylsiloxane units (the number average molecular weight was about 350,000); 45 parts of a wet-process fine silica powder; and 5 parts of a plasticizers in the form of a dimethylsiloxane oligomer that was capped at both molecular terminals with silanol groups and had the viscosity of 30 mPa·s. The mixture was then further kneaded for 60 min. at 175° C.

Practical Examples 1 to 3

Comparative Examples 1 and 2

A uniform mixture was prepared in a two-roll mill from 100 parts of silicone rubber base composition No. 1 obtained in Reference Example 1 and 1.5 parts of the cerium oxide presented in Table 1 given below. The obtained mixture was tested for storage stability. A uniform mixture was also prepared in a two-roll mill by mixing 100 parts of silicone rubber base composition No. 1 obtained in Reference Example 1 with 0.1 parts the cerium oxide presented in Table 1 and with 0.4 parts of 2,5-dimethyl-2,5-di(t-butylperoxy) hexane. The obtained thermosetting silicone rubber composition was heated and cured. The obtained product was used for manufacturing specimens for measuring compression sets and for testing heat-resistant properties. The compression set and heat-resistant properties were measured by using the obtained specimens, and the results of measurements and tests are shown in Table 2 given below.

Practical Examples 4 to 6

Comparative Example 3

A uniform mixture was prepared by mixing silicone rubber base composition No. 1 obtained in Reference Example 1 with 0.05 mass % or 0.01 mass % of the cerium oxide presented in Table 3 given below. Following this, 100 parts of the obtained mixture were uniformly mixed in the two-roll mill with 0.4 parts of 2,5-dimethyl-2,5-di(t-butylperoxy) hexane. The prepared composition was heated and cured, and the obtained product was used for manufacturing specimens for measuring compression sets, and then relationships between the content of the cerium oxide powder and the compression set were compared. A silicone rubber sheet having a 2 mm thickness was produced by thermally curing the aforementioned thermosetting silicone rubber composition that contained 0.05 mass % of the cerium oxide powder, and transparency of the obtained sheet was checked. The results are shown in Table 3 given below.

Practical Example 7

Comparative Examples 4 and 5

A uniform mixture was prepared by mixing in a two-roll mill 100 parts of silicone rubber base composition No. 2, which was obtained in Reference Example 2, with cerium oxide in the amounts shown in Table 4 given below and with 0.4 parts of 2,5-dimethyl-2,5-di(t-butylperoxy) hexane. The obtained product was heated and cured, and the cured product was used for manufacturing specimens for measuring heat-resistant properties. Results of measurement of heat-resistance properties are shown in Table 4.

TABLE 1

|  | BET specific surface area (m$^2$/g) | Average particle size (nm) | Total light transmittance (%) | Primary particle size (nm) | Crystallinity (%) | Purity (%) |
| --- | --- | --- | --- | --- | --- | --- |
| Cerium oxide powder A | 115 | 85 | 90 | 7 | 36 | 70 |
| Cerium oxide powder B | 115 | 34 | 93 | 7 | 36 | 70 |
| Cerium oxide powder C | 55 | 959 | 90 | 15 | 63 | 99.8 |
| Cerium oxide powder D | 135 | 3268 | 87 | 6 | 46 | 99.9 |
| Cerium oxide powder E | 8 | 662 | 85 | 110 | 85 | 99.9 |

The following methods were used for measuring characteristics of the cerium oxide powders shown in Table 1.

Cerium oxide powder A: the product of Taki Kagaku Co., Ltd., trademark: Niedral U-100: a cerium oxide powder produced by the sol-gel method from an aqueous solution of a cerium salt and surface treated with an anionic surfactant.

Cerium oxide powder B: the product of Taki Kagaku Co., Ltd., trademark: Niedral W-100): a cerium oxide powder obtained by the sol-gel method from an aqueous solution of a cerium salt and surface treated with a phosphoric acid and a cationic surfactant.

Cerium oxide powder C: (the product of C.I. Kasei Co., Ltd., trademark: Nanotek CeO$_2$): a cerium oxide powder obtained by thermal decomposition from a gaseous phase.

Cerium oxide powder D: a cerium oxide powder having a pH of 3.8 of 3 mass % aqueous dispersion obtained by blowing carbon dioxide gas into a cerium oxide powder (the product of Nikki Co., Ltd.; trademark: Kojundo Sanka Cerium (High- Purity Cerium Oxide)) which is obtained by mechanically crushing after baking cerium carbonate powder.

Cerium oxide powder E: a cerium oxide powder obtained by thermal decomposition from a gaseous phase (the product of Rhodia Japan Co., Ltd.).

<Primary Particle Size>

This value was obtained by converting as a substantially spherical shape from real density of cerium oxide and BET specific surface area.

<Crystallinity>

The integrated intensity of measurement data obtained with the use of the Shimadzu X-ray diffractometer XRD-7000 and the crystallinity software Shimadzu X-ray diffractometer XRS-6100 were divided into crystallinity component and amorphous component, and then crystallinity was determined based on a ratio of one to the other.

<Average Particle Size>

The average particle size was determined by the dynamic scattering method with the use of a particle measuring instrument (the product of Particle Sizing Systems Co.; Model. NI COMP Model 370) and the particle distribution measurement instrument (the product of Nikkiso Company, Ltd.; MICROTRAC HRA MODEL 9320-X100).

<Purity>

Purity was determined by fluorescent X-ray analysis.

<Total Light Transmittance>

A gum copolymer of a methylvinylsiloxane and dimethylsiloxane which was capped at both molecular terminals with dimethylvinylsilyl groups and contained 99.8 mole % of dimethylsiloxane units and 0.13 mole % of methylvinylsiloxane units (number average molecular weight: 350,000) was uniformly mixed and kneaded with 0.1 mass % of the cerium oxide powder in a two-roll mill. The obtained mixture in an amount of 100 parts was compounded with 0.4 parts of 2,5-dimethyl-2,5-di(t-butylperoxy) hexane, and the mixture was formed into a 1 mm-thick cured sheet by compression molding for 10 min. at 170° C. Total light transmittance through the obtained sheet was measured according to JIS K7105 by Water Analyzer-200N of Nippon Denshoku Industries Co., Ltd. Air was used as a reference.

TABLE 2

|  | Practical Examples | | | Comparative Examples | |
| --- | --- | --- | --- | --- | --- |
|  | 1 | 2 | 3 | 1 | 2 |
| Cerium oxide powder | A | B | C | D | E |
| Compression set | 8 | 7 | 8 | 15 | 16 |
| Resistance to heat (250° C. × 96 hours) | | | | | |
| Change of hardness | 15 | 13 | 8 | 35 | 32 |
| Retention of tensile strength (%) | 74 | 75 | 85 | 20 | 22 |
| Retention of elongation (%) | 52 | 59 | 70 | 10 | 15 |
| Storage stability | | | | | |
| 70° C. × 72 hours | ◯ | ◯ | ◯ | ◯ | ◯ |
| 100° C. × 72 hours | ◯ | ◯ | ◯ | X | ◯ |

TABLE 3

|  | Practical Examples | | | Comparative Examples 3 |
| --- | --- | --- | --- | --- |
|  | 4 | 5 | 6 | |
| Cerium oxide powder | A | B | C | D |
| Compression set (%) | | | | |
| Cerium oxide powder 0.05 (%) | 7 | 8 | 8 | 16 |
| Cerium oxide powder 0.01 (%) | 8 | 8 | 10 | 16 |
| Transparency | | | | |
| Cerium oxide powder 0.05 (%) | Transparent | Semi-transparent | | Opaque |

TABLE 4

|  | Practical Ex. 7 | Comp. Ex. 4 | Comp. Ex. 5 |
| --- | --- | --- | --- |
| Silicone rubber base composition No. 2 (parts) | 100 | 100 | 100 |
| Cerium oxide powder B (parts) | 0.1 | — | — |
| Cerium oxide powder D (parts) | — | — | 1 |
| Heat-resistant properties (230° C. × 96 hours) | | | |
| Change of hardness | −2 | −2 | −4 |
| Retention of tensile strength (%) | 67 | 59 | 60 |
| Retention of elongation (%) | 79 | 70 | 70 |

<Storage Stability Test of Silicone Rubber Base Composition>

200 g of the silicone rubber base composition No. 1 prepared in Reference Example 1 were uniformly mixed with 3 g of the cerium oxide powder of Table 1 in the two-roll mill, and the mixture was loaded into and sealed in a metal round container having a 1-liter capacity. Following this, the container was retained for three days in a heating oven set to a temperature of 70° C. or 100° C. Upon completion of heating, the obtained silicone rubber base composition was kneaded for 3 min. in a 6" two-roll mill under the following conditions: gap between the rolls: 3 mm; frequency of rotation; 20 rpm and 28 rpm. Upon completion of mixing and kneading, the silicone rubber composition was peeled off from the roll in the form of a sheet. Smoothness of the sheet was visually inspected and evaluated in accordance with the following criteria:

◯: the surface is smooth

X: the surface is wavy, rough, and the silicone rubber composition becomes viscous and partially gelated.

<Compression Set>

Compression-set test specimens were prepared by subjecting the thermosetting silicone rubber compositions to pressure molding for 10 min. at 170° C. The specimens were then placed into a heating oven adjusted to 200° C. and subjected to secondary curing by heating for 4 hours. The obtained specimens were compressed 25% at 180° C. for 22 hours and compression set was determined according to JIS K6262.

<Heat-Resistance Test of the Silicone Rubber>

2 mm-thick silicone rubber sheets were produced by compression molding the thermosetting silicone rubber compositions for 10 min. at 170° C. The sheets were then placed into a heating oven adjusted to 200° C. and subjected to secondary curing by heating for 4 hours. Hardness of the treated sheets was measured by a type A durometer according to JIS K6253, while the tensile strength and elongation were measured according to the provisions of JIS K6251. The sheets manufactured as described above were further tested for ageing by heating for 96 hours in a heating oven adjusted to 230° C. or 250° C. The sheets tested by heating were again tested with regard to hardness, tensile strength, and elongation. The change of hardness, retention of tensile strength, and retention of elongation were calculated as follows:

Change of hardness=(hardness after ageing)−(hardness prior to ageing)

Retention of tensile strength (%)=(tensile strength after ageing/tensile strength prior to ageing)×100

Retention of elongation (%)=(elongation after ageing/elongation prior to ageing)×100

INDUSTRIAL APPLICABILITY

The thermosetting silicone rubber composition of the invention makes it possible to form molded silicone-rubber products that demonstrate excellent resistance to heat, low compression set, and low deterioration after exposure to high temperatures that exceed 200° C. Therefore, the above composition is suitable for manufacture of rubber parts that operate under high-temperature conditions, such as rubber parts operating in the vicinity of an automobile engine, fixation rollers of electrophotographic apparatuses, pressure rollers, etc. Furthermore, the thermosetting silicone rubber composition of the invention makes it possible to form silicone rubber products which, along with high resistance to heat have excellent transparency or semi-transparency, have a low compression set, and have low loss of physical properties after exposure to high temperatures that exceed 200° C. In view of the above, the composition is suitable for manufacturing such parts as lamp covers, or the like, that have to possess transparency and operate under high-temperature conditions.

The invention claimed is:

1. A thermosetting silicone rubber composition that contains a cerium oxide powder in an amount of 0.001 to 10 mass % and having a degree of crystallization in the range of 10 to 75%, and an organic peroxide compound and that is characterized by total transmittance of light equal to or greater than 90% according to JIS K7105 when the light is passed through a 1 mm-thick layer of an alkenyl-containing dimethylpolysiloxane gum with 0.1 mass % of said cerium oxide powder dispersed in the gum.

2. The thermosetting silicone rubber composition according to claim 1, wherein the cerium oxide powder is produced by a sol-gel method.

3. The thermosetting silicone rubber composition according to claim 1, wherein the cerium oxide powder is a surface-treated cerium oxide powder.

4. The thermosetting silicone rubber composition according to claim 1, wherein the content of component (D) in the composition ranges from 0.001 to 2 mass %.

5. The thermosetting silicone rubber composition according to claim 1, wherein a diameter of primary particles of the cerium oxide power ranges from 1 to 100 nm.

6. A thermosetting silicone rubber composition comprising: 100 parts by mass of alkenyl-containing diorganopolysiloxane (A); 5 to 150 parts by mass of a reinforcement filler (B); an organic peroxide curing agent (C); and a cerium oxide powder (D) having a degree of crystallization in the range of 10 to 75%, which, when dispersed in an alkenyl-containing dimethylpolysiloxane gum in an amount of 0.1 mass %, provides total transmittance of light equal to or greater than 90% according to JIS K7105 when the light is passed through a 1 mm-thick layer of said dimethylpolysiloxane gum.

7. The thermosetting silicone rubber composition according to claim 6, wherein the cerium oxide powder is a surface-treated cerium oxide powder.

8. The thermosetting silicone rubber composition according to claim 6, wherein the content of component (D) in the composition ranges from 0.001 to 10 mass %.

9. The thermosetting silicone rubber composition according to claim 6, wherein the cerium oxide powder is produced by a sol-gel method.

10. The thermosetting silicone rubber composition according to claim 6, wherein the content of component (D) in the composition ranges from 0.001 to 2 mass %.

11. The thermosetting silicone rubber composition according to claim 6, wherein a diameter of primary particles of the cerium oxide power ranges from 1 to 100 nm.

* * * * *